United States Patent

Gareiss et al.

Patent Number: 5,412,017
Date of Patent: May 2, 1995

[54] FLAMEPROOFED THEROPLASTIC MOLDING MATERIALS BASED ON POLYAMIDES

[75] Inventors: Brigitte Gareiss, Ludwigshafen; Petra Baierweck, Boehl-Iggelheim; Christoph Plachetta, Limburgerhof; Karlheinz Ulmerich, Lambsheim, all of Germany

[73] Assignee: BASF Aktiengesellschaft, Ludwigshafen, Germany

[21] Appl. No.: 214,421

[22] Filed: Mar. 18, 1994

[30] Foreign Application Priority Data

Apr. 20, 1993 [DE] Germany .......... 43 12 752.5

[51] Int. Cl.$^6$ ............... C08K 3/22
[52] U.S. Cl. ............... 524/436
[58] Field of Search ........... 524/436; 528/336, 312, 528/319

[56] References Cited

U.S. PATENT DOCUMENTS

| | | | |
|---|---|---|---|
| 3,419,517 | 12/1968 | Hedrick et al. | 528/312 |
| 3,835,101 | 9/1974 | Oswald et al. | 528/319 |
| 4,098,762 | 7/1978 | Miyata et al. | |
| 4,126,593 | 11/1978 | Takahashi | 524/436 |
| 4,145,404 | 3/1979 | Miyata et al. | |
| 4,963,610 | 10/1990 | Schmid et al. | |
| 5,025,042 | 6/1991 | Yoshida et al. | 524/436 |
| 5,026,818 | 6/1991 | Heinz et al. | 528/313 |
| 5,169,582 | 12/1992 | Illing | 528/318 |

FOREIGN PATENT DOCUMENTS

| | | |
|---|---|---|
| 278555 | 8/1988 | European Pat. Off. . |
| 335165 | 3/1989 | European Pat. Off. . |
| 426243 | 5/1991 | European Pat. Off. . |
| 2624065 | 12/1976 | Germany . |
| 53-104650 | 9/1978 | Japan . |
| 56-010554 | 2/1981 | Japan . |
| 60-232610 | 11/1985 | Japan . |
| 61-091232 | 5/1986 | Japan . |
| 63-210165 | 8/1988 | Japan . |

*Primary Examiner*—Veronica P. Hoke
*Attorney, Agent, or Firm*—Keil & Weinkauf

[57] ABSTRACT

Flameproofed thermoplastic molding materials are obtainable by mixing

A) from 20 to 70% by weight of a magnesium hydroxide and

B) from 0 to 70% by weight of conventional additives and processing assistants into a melt of C) from 10 to 80% by weight of a polyamide prepolymer having a viscosity number of from 40 to 100 ml/g and then carrying out solid-phase postcondensation.

7 Claims, No Drawings

FLAMEPROOFED THEROPLASTIC MOLDING MATERIALS BASED ON POLYAMIDES

The present invention relates to flameproofed thermoplastic molding materials obtainable by mixing
A) from 20 to 70% by weight of a magnesium hydroxide and
B) from 0 to 70% by weight of conventional additives and processing assistants
into a melt of
C) from 10 to 80% by weight of a polyamide prepolymer having a viscosity number of from 40 to 100 ml/g
and then carrying out solid-phase postcondensation.

The present invention furthermore relates to processes for the preparation of these thermoplastic molding materials, their use for the production of fibers, films and moldings, and the moldings thus obtainable.

For toxicological reasons, halogen-containing flameproofing agents are unsafe for production and processing. In case of fire, such flameproofing agents release corrosive hydrogen halides.

The flame-retardant action of magnesium hydroxide is disclosed in DE-A 26 24 065 and is based on the endothermic elimination of water and the self-extinguishing effect of the resulting water vapor.

The large amounts of filler required for adequate flameproofing lead to major problems during incorporation by means of conventional compounding methods. In particular, the melt foams due to the introduction of a large amount of air during incorporation, so that granules having a low bulk density are formed, ie. a lower weight of granules can be introduced into bags having the same volume.

EP-A-335 165 discloses that the high filler content can be incorporated by means of double compounding, ie. the hydroxide is introduced into the polyamide in 2 extrusion steps. However, the flameproofing properties are unsatisfactory.

Japanese Publications 53104-650 and 63210-165 disclose the use of surface-treated magnesium hydroxide as flameproofing agent for thermoplastics.

However, the mechanical properties are unsatisfactory and furthermore the problems of incorporation cannot be solved by the surface treatment.

It is an object of the present invention to provide flameproofed thermoplastic polyamide molding materials which have good flameproof properties and mechanical properties, in particular good impact strength.

In addition, foaming of the extrudate to be granulated should be avoided during incorporation of the large amounts of filler, so that compact granules having a high bulk density can be obtained.

We have found that this object is achieved by the thermoplastic molding materials defined at the outset.

Preferred embodiments are described in the subclaims.

We have also found processes for the preparation of these thermoplastic molding materials, their use for the production of fibers, films and moldings, and the moldings thus obtainable.

The novel molding materials contain, as component A), from 20 to 70, preferably from 30 to 60, in particular from 40 to 55, % by weight of a magnesium hydroxide as a flameproofing agent.

The commercial products are lamellar solids and generally have a specific surface area of from 5 to 100, preferably from 5 to 20, in particular from 8 to 12, m²/g, determined by the BET method according to DIN 66,131. The mean particle size is in general from 0.4 to 20 μm, preferably from 0.5 to 2 μm, in particular from 0.8 to 1.5 μm.

Preparation processes are known to a person skilled in the art, so that further details are unnecessary.

Magnesium hydroxides which have been pretreated on the surface with a silane compound are preferred as flameproofing agents in the novel molding materials.

As a result of treatment with a silane, more advantageous mechanical properties (in particular impact strength) of the moldings can be achieved.

Suitable silane compounds are those of the general formula III

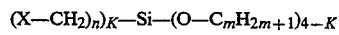

where
X is

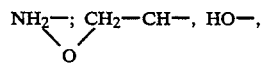

n is an integer from 2 to 10, preferably 3 or 4,
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes which contain a glycidyl group as substituent X.

The silane compounds are generally used in amounts of from 0.05 to 5, preferably from 0.5 to 1.5, in particular from 0.8 to 1, % by weight (based on A) for surface coating.

Novel thermoplastic molding materials may contain, as component B), conventional additives and processing assistants, such as stabilizers, antioxidants, heat stabilizers, ultraviolet stabilizers, lubricants, mold release agents, colorants, such as dyes and pigments, fibrous and pulverulent fillers and reinforcing agents, rubbers (impact modifiers), nucleating agents, plasticizers, etc., the amount of which is as a rule not more than 70, preferably not more than 40, % by weight.

Examples of antioxidants and heat stabilizers are halides of metals of group I of the Periodic Table of Elements, for example sodium halides, potassium halides and/or lithium halides, if necessary in combination with copper(I) halides, for example chlorides, bromides or iodides, sterically hindered phenols, hydroquinones, aromatic secondary amines, such as diphenylamines, various substituted members of these groups and mixtures thereof, in concentrations of up to 1% by weight, based on the weight of the thermoplastic molding material.

Examples of UV stabilizers, which are used in general in amounts of up to 2% by weight, based on the molding material, are various substituted resorcinols, salicylates, benzotriazoles and benzophenones.

Organic dyes, such as nigrosine, and pigments, such as titanium dioxide, cadmium sulfide, cadmium selenide, phthalocyanines, ultramarine blue and carbon black, may also be added as colorants, and fibrous and pulverulent fillers and reinforcing agents may also be introduced. Examples of the latter are carbon fibers, glass fibers, amorphous silica, asbestos, calcium silicate (wollastonite), aluminum silicate, magnesium carbonate, kaolin, chalk, powdered quartz, mica and feldspar. The amount of such fillers is in general up to 50, preferably from 10 to 35, % by weight.

Sodium phenylphosphinate, alumina, silica, nylon 22 and, preferably, talc may be used as nucleating agents.

Lubricants and mold release agents, which are usually used in amounts of up to 1% by weight, are preferably long-chain fatty acids (eg. stearic acid or behenic acid), salts thereof (eg. calcium stearate or zinc stearate) or ester derivatives (eg. stearyl stearate or pentaerythrityl tetrastearate) and amide derivatives (eg. ethylenebisstearylamide).

Examples of plasticizers are dioctyl phthalate, dibenzyl phthalate, butyl benzyl phthalate, hydrocarbon oils, N-(n-butyl)benzenesulfonamide and o- and p-tolylethylsulfonamide.

Suitable rubbers (impact modifiers) for polyamides, which can generally be used in amounts of up to 20% by weight, are known to a person skilled in the art and further information in this context is therefore unnecessary.

The novel thermoplastic molding materials contain, as component C), from 10 to 80, preferably from 20 to 70, in particular from 25 to 60, % by weight of a polyamide prepolymer having a viscosity number of from 40 to 100, preferably from 40 to 85, ml/g, measured in a 0.5% strength by weight solution in concentrated sulfuric acid at 23° C.

Examples of polyamides which may be used for the preparation of component C) are thermoplastic partly crystalline polyamides. Suitable polyamides can be prepared, for example, by condensation of equimolar amounts of a saturated dicarboxylic acid of 4 to 12 carbon atoms with a diamine of 4 to 14 carbon atoms or by condensation of ω-aminocarboxylic acids or polyaddition of lactams.

Examples of polyamides are polyhexamethyleneadipamide, polyhexamethyleneazeleamide, polyhexamethylenesebacamide, polyhexamethylenedodecanediamide, polytetramethyleneadipamide and the polyamides, such as polycaprolactam and polylaurolactam, obtained by ring cleavage of lactams.

As a rule, these partly crystalline polyamides are linear.

Polytetramethyleneadipamide, polyhexamethyleneadipamide, polyhexamethylenesebacamide and polycaprolactam and copolyamides of terephthalic acid, hexamethylenediamine and ε-caprolactam or of terephthalic acid, isophthalic acid, if required adipamide and hexamethylenediamine, containing more than 50% by weight of terephthalic acid/hexamethylenediamine units, are particularly preferred, polyhexamethyleneadipamide and polycaprolactam being very particularly preferred. However, mixtures of different polyamides may also be used.

The preparation of the polyamide prepolymers having a viscosity number of from 40 to 100 ml/g (component C) can be carried out, for example, by the processes described in EP-A 129 195, EP-A 129 196 and EP-A 299 444. Further conventional preparation methods, which may be batchwise or continuous, are known to a person skilled in the art and further information in this context is therefore unnecessary.

In a preferred procedure, the polyamide prepolymer is passed in the form of a melt through a discharge zone with simultaneous removal of the residual water present in the melt. Suitable discharge zones are, for example, devolatilization extruders. The melt freed in this manner from the water is then extruded and the extrudates are granulated. The granules obtained (component C) are melted at about 20° C. above the melting point of component C) (in the case of polyhexamethyleneadipamide, at about 280° C.), preferably in a twin-screw extruder, and are mixed with the flameproofing agent and, if required, component B), extruded, cooled and granulated.

In a particularly preferred embodiment, it is also possible to add component A) and, if required, B) to the devolatilization extruder itself, in which case the devolatilization extruder is usually equipped with suitable mixing elements, such as kneaders. Extrusion is then likewise carried out, and the extrudates are cooled and granulated.

These granules are subjected to continuous or batchwise solid-phase condensation under an inert gas at below the melting point, for example from 170 to 240° C., until the desired viscosity is obtained. For example, tumbling dryers may be used for the batchwise solid-phase condensation, and heating tubes through which a hot inert gas flows may be employed for the continuous solidphase condensation. The continuous solid-phase condensation is preferred, the inert gas used being nitrogen or, in particular, superheated steam, advantageously the steam obtained at the top of the column.

The viscosity number after the solid-phase postcondensation is in general from 130 to 500, preferably from 150 to 250, ml/g, measured in a 0.5% strength by weight solution in 96% strength sulfuric acid at 23° C.

The novel molding materials have good flameproof properties and mechanical properties. In particular, foaming of the extrudate to be granulated is drastically reduced during the incorporation of the large amounts of filler, so that compact granules having a high bulk density are formed.

EXAMPLES

Component A

Magnesium hydroxide, treated with aminosilane (Magnifin ® H10B, from Martinswerk GmbH, Germany)

Component B

Cut glass fibers, treated with aminosilane and having an average fiber length of 4.5 mm and an average fiber diameter of 10 µm.

Component C/1

A 65% strength aqueous solution of 40 kg of ε-caprolactam was heated to 270° C. in a 100 l autoclave in the course of 1 hour, the resulting pressure being kept constant after reaching 32 bar by releasing excess steam. The product was discharged under pressure from the autoclave into water, cooled and granulated. The prepolymer had a viscosity number of 85 ml/g and contained 11% of extractables (residual content of ε-caprolactam).

Component C/2

A copolyamide prepolymer consisting of 70% by weight of units derived from terephthalic acid/hexamethylenediamine and 30% by weight of units derived from ε-caprolactam, prepared by the process described in EP-A 129 195, a 65% strength aqueous solution of ε-caprolactam and an equimolar terephthalic acid/hexamethylenediamine salt being subjected to continuous polycondensation at 315° C. and 8 bar in a tube bundle reactor at a throughput corresponding to 8 kg/h of polyamide.

The product had a viscosity number of 85 ml/g.

Component C/1 V

PA6 having a viscosity number of 190 ml/g (Ultramid® B35 from BASF AG)

Component C/2 V

A copolyamide consisting of 70% by weight of units derived from terephthalic acid/hexamethylenediamine and 30% by weight of units derived from ε-caprolactam, having a viscosity number of 145 ml/g. (Ultramid® T KR 4351 from BASF AG)

Examples 1 and 2

In a twin-screw extruder (ZSK 53 from Werner & Pfleiderer), the prepolymer C/1 was melted at 260° C., mixed with component A and, if required, B in a conventional manner and compounded. Thereafter, the product was extracted twice at 60° C. in water for 4 hours in each case (weight ratio of product to water=1:4) and then dried for 12 hours at 80° C. under reduced pressure. The product was extruded, the extrudates were cooled and granulated and the granules were subjected to postcondensation under nitrogen at 160° C. in a tumbling mixer until the viscosity number stated in the table was obtained.

(The filler contents stated in the table are based on product after extraction.)

Example 3

The polyamide prepolymer (component C/2) in the form of a melt was introduced by means of a discharge screw from the separation vessel of the polycondensation unit into a twin-screw extruder (ZSK 53 from Werner & Pfleiderer) and was mixed with the Mg(OH)$_2$ at 300° C. Devolatilization was then effected by reducing the pressure, virtually no postcondensation occurring. The product was extruded, the extrudates were cooled and granulated and the granules were subjected to postcondensation under nitrogen at 200° C. in a tumbling mixer until the viscosity number stated in the table was obtained.

Comparative Examples 1 to 4

Components C/1 V and C/2 V were melted in a twin-screw extruder (ZSK 53 from Werner & Pfleiderer) at 260° C. and 320° C., respectively, and were mixed with component A and, if required, B in a conventional manner and compounded.

Comparative Example 5 V (according to EP-A 335 165)

In a 1st step, component C/1 V was first compounded at 260° C. with 25% by weight of Mg(OH)$_2$ in a twin-screw extruder in a conventional manner.

In a 2nd step, the granules obtained were again introduced into a twin-screw extruder and melted. A further 20% by weight of Mg(OH)$_2$ and 10% by weight of glass fibers (component B) were then added. The melt was extruded and the extrudates were cooled and granulated.

Standard test specimens were produced on an injection molding machine at 260° C. and 300° C., respectively.

The flameproofing properties according to UL 94 were determined for the products in 1/32 inch bars, and the impact strength ($a_n$) of the products was measured according to DIN 53,453.

The bulk density was determined after mechanical shaking of the granules by weighing 1l of granules.

The composition of the molding materials and the results of the measurements are shown in the table.

TABLE

| Example | Composition [% by weight] | | | Viscosity number after compounding [ml/g] | Viscosity number after postcondensation [ml/g] | UL94 1/32″ | $a_n$ [kJ/m$^2$] | bulk density [g/l] |
|---|---|---|---|---|---|---|---|---|
| 1 | 50 A | | 50 C/1 | 89 | 154 | V-0 | 42 | 720 |
| 1 V | 50 A | | 50 C/1 V | 125 | — | V- | 27 | 600 |
| 2 V | 60 A | | 50 C/1 V | 120 | — | V-0 | 22 | 540 |
| 2 | 45 A | 10 B | 45 C/1 | 87 | 155 | V-0 | 45 | 700 |
| 3 V | 45 A | 10 B | 45 C/1 V | 115 | — | V-2 | 32 | 500 |
| 3 | 40 A | 10 B | 50 C/2 | 90 | — | V-0 | 42 | 700 |
| 4 V | 40 A | 10 B | 50 C/2 V | 112 | — | V- | 10 | 350 |
| 5 V | 45 A | 10 B | 45 C/1 V | 110 | — | V-2 | 25 | — |

In contrast to Example 1, no UL classification is achieved in 1 V. V0 is achieved in 2 V only with an additional 10% of hydroxide, the impact strength deteriorating substantially.

When C/2 V is used, the granules exhibit pronounced foaming (low bulk density), indicating polymer degradation and elimination of water from the hydroxide (Example 4 V). The impact strength is substantially poorer compared with Example 3.

We claim:

1. A process for preparing a flameproofed thermoplastic molding material which comprises the steps of mixing
   A) from 20 to 70% by weight of a magnesium hydroxide and
   B) from 0 to 70% by weight of conventional additives and processing assistants
   into a melt of
   C) from 10 to 80% by weight of a polyamide prepolymer having a viscosity number of from 40 to 100 ml/g
   and then carrying out solid-phase postcondensation.

2. The process of claim 1, wherein, after the solid-phase postcondensation, the polyamide has a viscosity number of at least 130 ml/g.

3. The process of claim 1, wherein component A is a magnesium hydroxide pretreated with a silane compound.

4. A flameproofed thermoplastic molding material prepared according to the process of claim 1.

5. A flameproofed thermoplastic molding material prepared according to the process of claim 2.

6. A flameproofed thermoplastic molding material prepared according to the process of claim 3.

7. A molding obtained from a flameproofed thermoplastic molding material as defined in claim 4.

* * * * *